Jan. 23, 1968 R. E. RAILSON 3,364,973
RETRACTABLE AWNING
Filed Dec. 6, 1965 2 Sheets-Sheet 1
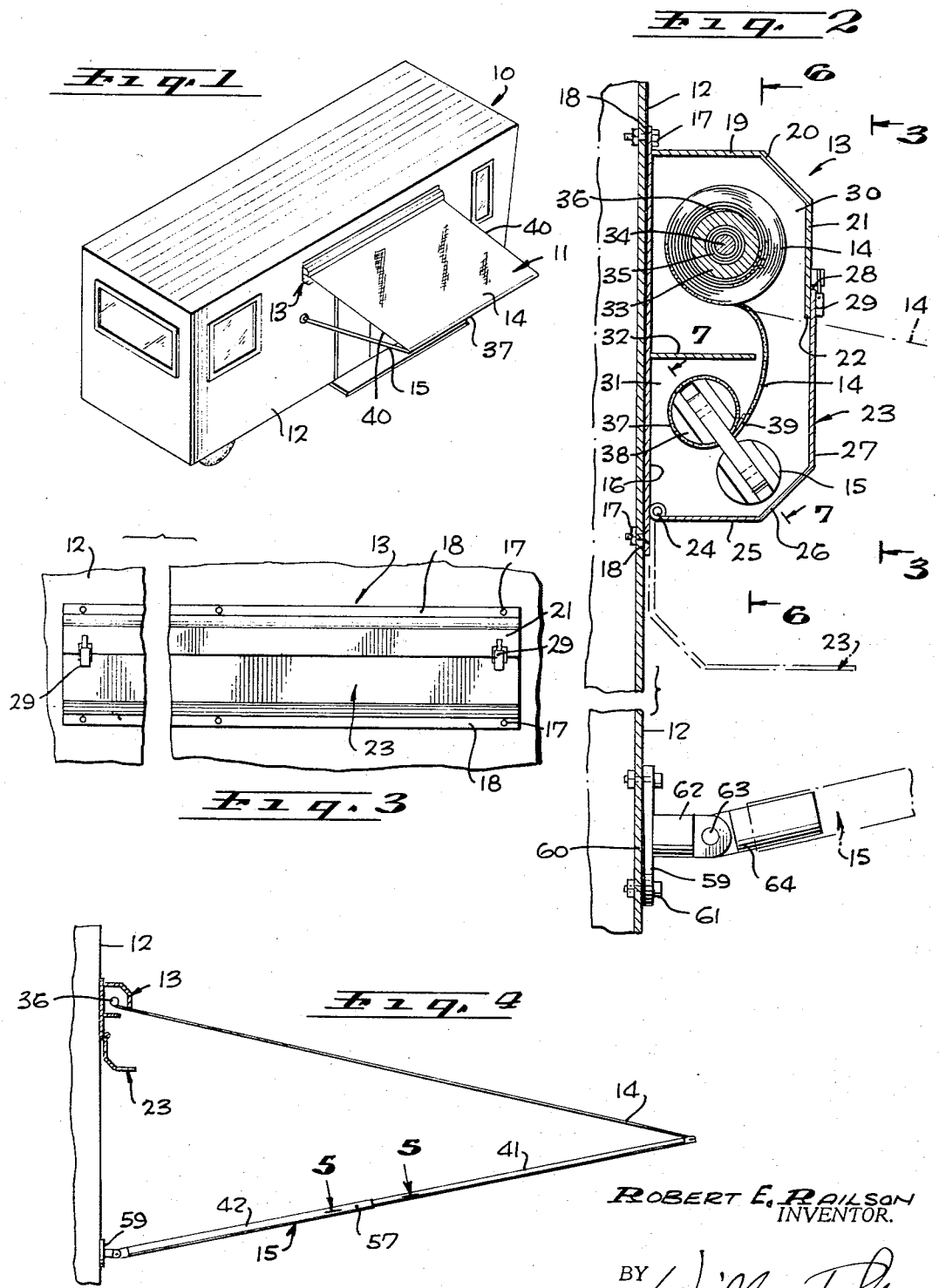
ROBERT E. RAILSON
INVENTOR.
BY William P. Green
ATTORNEY Jan. 23, 1968   R. E. RAILSON   3,364,973
RETRACTABLE AWNING
Filed Dec. 6, 1965   2 Sheets-Sheet 2
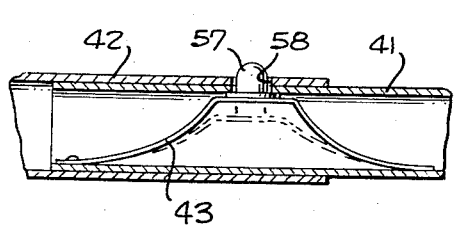
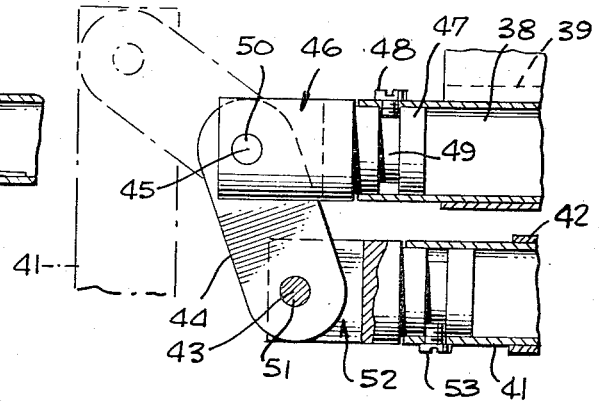
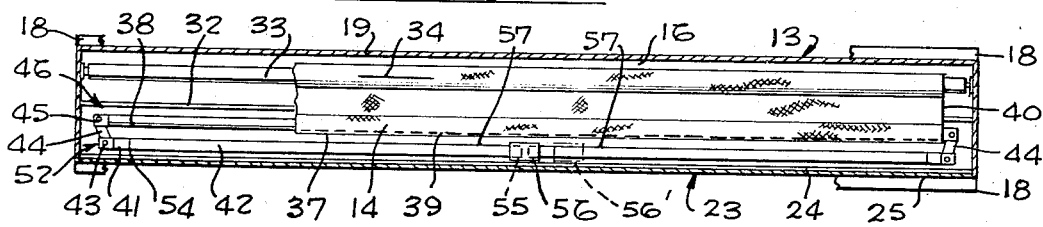
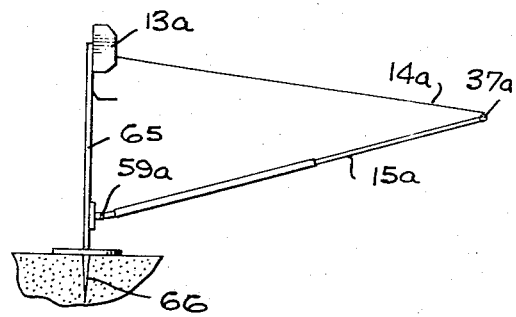
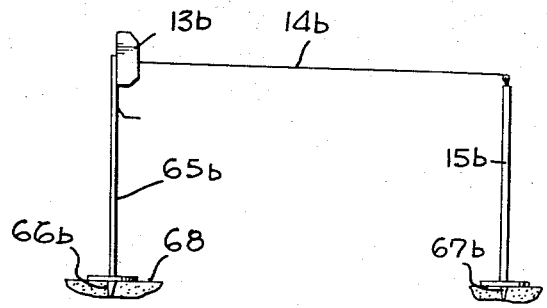
ROBERT E. RAILSON
INVENTOR.
BY William F. Green
ATTORNEY

United States Patent Office 3,364,973
Patented Jan. 23, 1968

3,364,973
RETRACTABLE AWNING
Robert E. Railson, Orange, Calif., assignor of fifty percent to Lionel N. Childress, San Clemente, Calif.
Filed Dec. 6, 1965, Ser. No. 511,702
14 Claims. (Cl. 160—22)

ABSTRACT OF THE DISCLOSURE

A retractable awning windable about a spring urged take-up roller and having braces connected to opposite ends of an outer edge of the awning and adapted to swing, while the awning is and remains extended, between active bracing positions and inactive or retracted positions of extension alongside and parallel to the outer edge of the awning.

---

This invention relates to an improved retractable shade or awning structure, of a type adapted to extend over and cover a patio area, or any other area to be protected.

A major object of the invention is to provide a shade arrangement which may be easily transported in a retracted or inactive condition, and which is very easily and rapidly convertible from that condition to an opened condition of use whenever it is desired to employ the shade as an area cover. For instance, a shade or awning structure embodying the invention may be mounted to a mobile home, house trailer or camper, with the entire awning being received closely adjacent an outer wall of the trailer or camper while in motion, but being easily extendable to an active position of use within a very short interval, usually merely a few seconds, after arrival of the vehicle at a desired destination. It is contemplated also that the invention may be utilized as a portable awning or shade structure for other environments, such as a stationary house or building, on a ship or boat, or as a portable unit which is completely self contained and adapted to be erected as a temporary cover on the beach, or as a protective or camouflaging cover for troops or the like.

Particularly contemplated is an arrangement including one or more braces adapted to hold the shade in its extended active condition, and in which the braces are so mounted to the rest of the structure as to minimize the time required in actuating the braces to their active positions, and further to prevent accidental misplacing of the braces when the awning is retracted. As will appear, this advantage is attained by mounting the brace or braces in unique manner to an outer edge portion of the awning, in a relation enabling the braces to be swung from an active bracing position to inactive positions in which the braces remain connected to the outer edge portion of the awning, but extend essentially along that edge portion and generally parallel thereto, so that the braces may be received in highly compact manner in their retracted condition. When it is desired to open the awning, it is necessary merely to pull the outer edge portion of the awning to an extended position, and swing the braces from their retracted positions adjacent the edge of the awning to active positions in which they may brace the awning and hold it extended. Preferably, the entire awning arrangement, including the braces, is received within an elongated housing when the apparatus is retracted. The braces may be of telescoping construction, to further facilitate their actuation to an appropriate condition for bracing the awning, and may be suitably retainable in both their active and inactive conditions.

The above and other features and objects of the invention will be better understood from the following detailed description of the typical embodiments illustrated in the accompanying drawing, in which:

FIG. 1 is a perspective representation of a house trailer having a shade or awning structure constructed in accordance with the invention;

FIG. 2 is a fragmentary vertical section through the shade assembly in its retracted or inactive condition;

FIG. 3 is a front view of a shade taken on line 3—3 of FIG. 2;

FIG. 4 is a side view, partially in section, of the shade in opened condition;

FIG. 5 is an enlarged fragmentary section taken on line 5—5 of FIG. 4;

FIG. 6 is a section taken on line 6—6 of FIG. 2;

FIG. 7 is an enlarged fragmentary section on line 7—7 of FIG. 2; and

FIGS. 8 and 9 are somewhat diagrammatic representations of two variational forms of the invention.

Referring first to FIG. 1, I have shown at 10 a house trailer having a shade or awning unit 11 constructed in accordance with the invention mounted to one of the vertical side walls 12 of the trailer. The unit 11 includes a housing 13 which is elongated to extend generally horizontally along side wall 12 of the trailer, and which contains a flexible shade proper designated 14, and adapted to be retracted into housing 13. The shade is held in its extended condition by two braces 15.

As seen best in FIG. 2, housing 13 may have a vertical back wall 16 which is received adjacent the side wall 12 of the trailer, and which is secured rigidly to that side wall by bolts, screws or other fasteners designated 17, and typically extending through bracket ears or tabs 18 formed by wall 16. Extending outwardly from the upper edge of rear wall 16, housing 13 has a top wall 19, which may be directly horizontal, and which is bent to extend angularly downwardly at 20, and directly downwardly at 21 to a lower edge 22 of this wall. Cooperating with wall 19 to complete the housing, there may be an elongated closure or door member 23, which is mounted by a horizontal hinge 24 to swing between the full line and broken line positions of FIG. 2, and which in closed position extends horizontally outwardly at 25, then upwardly at an inclination at 26, and vertically at 27 to an upper horizontal edge 28 received closely adjacent the previously mentioned edge 22 of wall 19. Door 23 may be retainable in its closed position by suitable latches, such as those designated 29 in the figures, which may be conventional toggle latches having two cooperating releasably inter-engageable sections carried by wall 19 and door 23 respectively, and of the type conventionally utilized on tool boxes etc.

Internally, the housing 13 may be divided into an upper horizontally elongated space 30 and a lower similarly elongated space 31 by a horizontal partition 32. Within the upper space 30, there is mounted an elongated tubular roller 33, mounted to turn about a horizontal axis 34 extending longitudinally of housing 13, and containing a spring diagrammatically represented at 35 acting to yieldingly turn roller 33 in a take-up direction. The previously mentioned shade or awning 14, which may be formed of canvas or any other appropriate flexible sheet material, is wound about roller 33, and has an inner edge 36 disposed parallel to axis 34 and rigidly tacked or otherwise secured to tube 33. A second edge 37 of the flexible shade 14 extends parallel to its inner edge 36, and to axis 34, and is adapted to be pulled outwardly as shown in FIG. 1 to extend the shade to active condition. To reinforce and strengthen outer edge 37 of the shade, this edge may be wrapped about a reinforcing tube 38 (FIG. 6), and be stitched to itself at 39 to retain the tube. Extending between its inner and outer edges 36 and 37, the shade 14 may have two opposite side edges 40 (FIG. 1), which may extend parallel to one another and perpendicular to the edges 36 and 37, so that the shade has an overall rectangular configuration. In association with spring 35, the roller may have appropriate ratchet or other means for holding the roller in an extended shade condition, in the manner of conventional spring urged window shades and the like.

The two angular braces 15 for supporting shade 14 in its extended condition are movably connected to opposite ends of tube 38 at the outer edge of the shade, for swinging movement between the retracted position of FIGS. 2 and 6, and the active position of FIGS. 1 and 4. Each of these braces 15 may include two telescopically interengaging tubes 41 and 42, the first of which has one of its ends pivotally connected at 43 to a link 44 whose second end is pivotally connected at 45 to a mounting bracket 46 secured to one end of the previously mentioned tube 38. As best brought out in FIG. 7, bracket 46 may have a portion 47 projecting into an end of tube 38, and secured therein by a screw 48 which is threadedly connected into the side wall of tube 38 and projects inwardly into an annular groove 49 formed in the periphery of bracket 46. Outwardly beyond tube 38, this bracket 46 may be bifurcated to form two spaced arms between which an end of link 44 is pivotally received, with the pivotal connection 45 being formed by a pivot pin 50 extending through the link and the bifurcated end of bracket 46. Similarly, the pivotal connection 43 between tube 41 and link 44 may be formed by a pin 51 extending parallel to pivot pin 50 and projecting through registering apertures in the other end of link 44 and in two arms of a bracket 52 which may be identical with the discussed bracket 46. Bracket 52 may be secured to tube 41 by a screw 53 corresponding to screw 48.

When the two telescopic tubes 41 and 42 of each of the braces 15 are actuated to their shortest conditions as indicated in FIG. 6, in which each of the tubes 42 is slid along the associated tube 41 until the end 54 of tube 42 almost engages link 44, the two brace assemblies 15 may then extend alongside tube 38 and the associated edge portion 37 of awning 14 in an axially aligned end to end relation, as seen in FIG. 6. Each of the braces 15 then occupies only about one-half of the length of edge portion 37 of the shade, with the two tubes 42 having ends at 55 which are received in closely adjacent relation and are secured in the FIG. 6 positions by a preferably rigid and preferably metal sleeve 56, which partially encircles each of the tubes 42 to retain them in alignment. This sleeve 56 is slidable along one of the tubes 42 to a position such as that represented in broken lines at 56' in FIG. 6, to free the braces for swinging movement to their active positions, with sleeve 56 being a tight enough fit on tubes 42 to frictionally remain in the broken line position of FIG. 6 until it is again desired to use the sleeve for locking the braces in their retracted positions.

When the awning is to be utilized in open position, tubes 42 of the braces are slid longitudinally relative to tubes 41 to the extended positions of FIG. 4, in which the lengths of tubes 41 and 42 are additive to provide an overall brace assembly long enough to hold shade 14 in its extended position. The braces are retained in this extended position by appropriate detent means, such as the spring pressed detent element represented at 57 in FIG. 5, and taking the form of a button which projects outwardly through registering apertures 58 in the two tubes 42 and 41. A leaf spring or springs 43 may urge button 57 radially outwardly to the full line position of FIG. 5, but with this button being depressable inwardly manually to the broken line position of FIG. 5, so that the button is no longer received within the aperture in tube 42, but is still received within the aperture in tube 41, to release tube 42 for longitudinal telescopic retracting movement relative to tube 41. Apertures such as are shown at 58 are provided for holding the tubes 41 and 42 in their extended positions of FIG. 4, and also in their longitudinally shortened condition of FIG. 6, and preferably also in an intermediate length condition in which shade 14 is extended only partially from housing 13.

For coaction with braces 15 in their active positions, there may be mounted to the side wall 12 of the trailer a pair of anchoring brackets such as those designated 59 in FIG. 2. Each of these brackets may have a base portion 60 secured by screws or other fasteners 61 to side wall 12 of the trailer, and carrying a projection 62 to which there is pivoted at 63 a pin 64 which is externally cylindrical and of a diameter corresponding to the internal diameter of tube 42, so that tubes 42 may be received telescopically about pins 64 of the two brackets 59, with pins 64 inclined slightly upwardly, in a relation anchoring the free ends of braces 15 to the side wall of the trailer.

To now describe the manner of use of the form of the invention shown in FIGS. 1 through 7, assume first of all that the shade is in the retracted position of FIG. 2, with door 23 closed and secured in closed position by latches 29. In this condition, the outer edge portion 37 of the shade and its contained tube 38 and carried braces 15 are all received in the lower compartment or space 31 of the housing, with shade 14 extending downwardly past the end of partition 32. The inactive braces are in end to end relation, disposed about an axis parallel to the axis of tube 38, and retained in that position by sleeve 56. When it is desired to use the shade, a person may release latches 29 to allow door 23 to fall downwardly to the broken line position of FIG. 2, and may then pull the shade outwardly from the housing, by grasping the edge of the awning which is reinforced by tube 38. This unwinds the awning from tube 33, ultimately to the condition illustrated in FIG. 1, following which sleeve 56 may be slid from the full line to the broken line position of FIG. 6, so that braces 15 may be swung from the full line position of FIG. 7 to the broken line position of that figure, and by manual release of detent buttons 57 of FIG. 5, the tubes 42 of the braces may be freed for longitudinal movement to their extended FIG. 4 positions relative to tubes 41. The free ends of these tubes 42 may then be slipped over pins 64 of brackets 59, with the tubes being held in extended position by detent buttons 57, so that the erection of the shade is thus completed with maximum facility and ease. In the active position of the shade, the links 44 may assume a somewhat angularly disposed position similar to that shown in broken lines in FIG. 7, or may be permitted to assume any other position which they may desire to take for transmitting the support forces from the braces to tube 38. When it is desired to retract the shade, this may be accomplished by detaching tubes 42 from brackets 59, telescopically shortening braces 15, swinging these braces to the FIG. 6 position of parallelism with respect to the outer edge portion 37 of the awning and tube 38, retaining the braces in this position by sleeve 56, and then allowing the shade to wind back onto roller 33 so the door 23 may again be closed. It is contemplated that additional elements may also be stored within space 31 in the housing, such as side curtains adapted to be secured to and hang downwardly from the edges of shade 14, or any other accessory for use with the shade.

FIG. 8 shows a variational form of the invention which may be utilized as an awning on the beach or at other similar locations. For this purpose, the housing 13a, shade 14a, braces 15a, and brackets 59a may all be identical with the corresponding parts of FIGS. 1 to 7, except that housing 13a, instead of being mounted to the wall of a trailer or the like, is supported at its opposite ends on two upstanding parallel posts 65, having lower ends 66 which may be sharpened for projection downwardly into the sand or an earth formation. Brackets 59a may be mounted to lower portions of the two posts 65, to serve the function of brackets 59 of FIG. 2 in detachably anchoring the free ends of braces 15a. The braces are mounted generally pivotally to the opposite ends of the free edge portion 37a of shade 14a, in the same manner illustrated in FIG. 6 and discussed in detail in connection with the first form of the invention, so that the awning and its braces may be retracted into the housing in the manner illustrated in FIG. 2.

FIG. 9 shows another form of the invention which may be the same as shown in FIG. 8, except that the braces 15b, corresponding to braces 15 of FIG. 1 and braces 15a of FIG. 8, do not connect to anchoring elements such as those shown at 59 and 59a in the first two forms of the invention, but rather have sharpened ends at 67b adapted to project downwardly into and be anchored within the earth or sand 68, in the same manner as are the lower sharpened ends 66b of posts 65b to the upper end of which is mounted housing 13b. Braces 15b may be retracted to positions such as those shown in FIG. 6, and may be retracted with the awning into housing 13b in the manner illustrated in FIG. 2.

Another form of the invention which will be obvious without illustration would correspond with the showing of FIG. 8 except that, instead of posts 65 having sharpened ends 66 at their lower extremities, the bottoms of these posts could be mounted on a rolling platform adapted to be shifted along a support surface, with the posts 65 and carried structure, to any desired location of use.

I claim:

1. The combination comprising a take-up roller, a flexible shade windable about said roller and actuable between a retracted position about the roller and an active position in which the shade extends outwardly from the roller, said shade having an outer edge portion which is spaced outwardly from and generally parallel to the roller in said active position and is closer to the roller in said retracted position, a rigid tubular member attached to said edge portion of the shade and extending along said edge portion essentially parallel to said roller, two braces for supporting said outer edge portion of the shade in said active position, mounting means connecting first ends of said braces essentially pivotally to opposite ends respectively of said tubular member for swinging movement between bracing positions generally perpendicular to said tubular member and inactive positions alongside and generally parallel to said edge portions of the shade and said tubular member and generally parallel to the roller, two anchoring brackets connectible to a support structure and adapted to be detachably interengaged with second ends of said braces respectively to hold the latter in bracing positions, each of said braces including two telescopically interengaged and adjustable tubes which are adjustable to shortened condition in said inactive positions, spring pressed detent elements in the tubes interengageable with apertures in the tube walls for releasably retaining the tubes in different positions, a sleeve slidably receivable about adjacent ends of said two braces in said inactive positions in a relation locking them in said inactive postions, and an elongated housing containing an upper space containing said roller and a lower space for receiving said outer edge portion of the shade and said tubular member and said braces in said retracted and inactive positions, said housing having an elongated door closing a front side of said lower space and hinged to swing downwardly to an open position for providing access to the shade.

2. The combination comprising a take-up roller, a flexible shade windable about said roller and actuable between a retracted position about the roller and an active position in which the shade extends outwardly from the roller, means yieldingly urging said roller rotatably in a direction to wind said shade thereon, said shade having an outer edge portion which is spaced outwardly from and generally parallel to the roller in said active position and is closer to the roller in said retracted position, an outer member attached to said edge portion of the shade and extending therealong essentially parallel to said roller, two elongated braces for supporting said outer member and said edge portion of the shade in said active position, two mounting means connecting first ends of said braces essentially pivotally to opposite ends respectively of said outer member for swinging movement between bracing positions generally perpendicular to said outer member and inactive positions of extension alongside and generally parallel to said outer member and generally parallel to the roller, two anchoring brackets connectible to a support structure, and connections between said anchoring brackets respectively and second ends of said braces for holding the braces in bracing positions and thereby supporting the shade in its active position, said connections being detachable while said shade is extended to said active position, and said braces when thus detached from the brackets being free for swinging movement to said inactive positions of extension alongside and generally parallel to said outer member and said outer edge portion of the shade while the shade remains extended from the roller in said active position, and being adapted to remain alongside and generally parallel to said outer member as the shade is then wound on the roller.

3. The combination as recited in claim 2, in which said braces in said inactive positions thereof are of lengths not greater than one-half of the length of said outer member and do not overlap one another longitudinally.

4. The combination as recited in claim 2, in which said braces are longitudinally extensible for use in said bracing postions and are longitudinally contractible to shortened conditions in which they have lengths not greater than one-half of the length of said outer member and do not overlap one another longitudinally in said inactive positions of the braces.

5. The combination as recited in claim 2, in which each of said two mounting means includes a short link pivotally connected at one end to said outer member and at another end to an end of one of said braces.

6. The combination as recited in claim 2, in which each of said braces includes two telescopically interfitting and relatively adjustable sections which are extensible to an increased length in said bracing position and are shortenable to a decreased length when in said inactive position alongside said outer member and said edge portion.

7. The combination as recited in claim 6, including detent means for releasably retaining said telescopically interfitting sections in predetermined positions.

8. The combination as recited in claim 2, including a housing containing said roller and having a space for receiving within the housing said outer member and said outer edge portion of the shade and said braces in said retraced position of the shade and said inactive position of the braces.

9. The combination as recited in claim 2, including an elongated housing having an upper space containing said roller and a lower space for receiving said outer member and said outer edge portion of the shade and said braces in retracted position, said housing having a closure portion closing said lower space and hinged to swing downwardly to an open position for providing access to the shade to extend it to active position.

10. The combination as recited in claim 2, including means for releasably holding said braces in said inactive positions thereof.

11. The combination as recited in claim 2, including a holding structure slidably interfiitting with opposed end portions of both of said braces in said inactive positions thereof in a relation locking the braces in said inactive positions.

12. The combinations as recited in claim 2, including a pair of upstanding poles supporting said roller and carrying said brackets therebeneath and having essentially sharpened ends adapted to be driven into and anchored within the earth.

13. The combination comprising a take-up roller, a flexible shade windable about said roller and actuable between a retracted position about the roller and an active position in which the shade extends outwardly from the roller, means yieldingly urging said roller rotatably in a direction to wind said shade thereon, said shade having an outer edge portion which is spaced outwardly from and generally parallel to the roller in said active position and is closer to the roller in said retracted position, an outer member attached to said edge portion of the shade and extending therealong essentially parallel to said roller, two elongated braces for supporting said outer member and said edge portion of the shade in said active position, two mounting means connecting first ends of said braces essentially pivotally to opposite ends respectively of said outer member for swinging movement between bracing positions generally perpendicular to said outer member and inactive positions of extension alongside and generally parallel to said outer member and generally parallel to the roller, means for holding second ends of said braces essentially fixed when the braces are in said bracing positions to thereby maintain the braces in said bracing positions and support the shade, said last mentioned means being releasable while the shade is extended to its active position, and said braces when thus released being free for swinging movement to said inactive positions of extension alongside and generally parallel to said outer member and said outer edge portion of the shade while the shade remains extended from the roller to said active position, and being adapted to remain alongside and generally parallel to said outer member as the shade is then wound on the roller.

14. The combination as recited in claim 13, in which said means for holding said second ends of the braces include means forming essentially sharp projections at said second ends of the braces adapted to project into a ground surface and thereby locate said second ends fixedly relative thereto.

References Cited
UNITED STATES PATENTS

| | | | |
|---|---|---|---|
| 286,495 | 10/1883 | Smith | 160—45 |
| 1,258,977 | 3/1918 | Baptiste | 160—71 |
| 1,534,664 | 4/1925 | Saunders | 160—72 X |
| 1,844,410 | 2/1932 | Schalk. | |
| 1,928,366 | 9/1933 | Buckingham | 160—81 |
| 2,112,579 | 3/1938 | Schane | 160—22 |
| 2,578,964 | 12/1951 | Bell | 160—81 |
| 2,579,780 | 12/1951 | Atwood | 160—77 X |
| 2,921,763 | 1/1960 | Miller et al. | 248—121 |
| 3,025,866 | 3/1962 | Cockrum | 160—46 X |

FOREIGN PATENTS

| | | |
|---|---|---|
| 510,461 | 8/1939 | Great Britain. |

DAVID J. WILLIAMOWSKY, *Primary Examiner.*

D. L. TAYLOR, *Assistant Examiner.*